United States Patent [19]

Anderson

[11] Patent Number: 5,002,446
[45] Date of Patent: * Mar. 26, 1991

[54] TOOL FOR OVERHEAD SHEET INSTALLATION

[76] Inventor: Paul C. Anderson, R.D. #4, 143 Maple Ave., Chester, N.J. 07930

[*] Notice: The portion of the term of this patent subsequent to Dec. 26, 2006 has been disclaimed.

[21] Appl. No.: 537,252

[22] Filed: Jun. 12, 1990

[51] Int. Cl.⁵ .................. F16B 23/00; F16B 45/00
[52] U.S. Cl. ............................. 411/400; 411/396; 411/409; 411/908; 52/DIG. 1
[58] Field of Search ............... 411/398, 400, 401, 480, 411/908, 396; 52/DIG. 1; 248/216.1, 217.4

[56] References Cited
U.S. PATENT DOCUMENTS

| | | | |
|---|---|---|---|
| 1,188,305 | 6/1916 | Noerteman | 411/409 |
| 1,289,450 | 12/1918 | Holaday | 411/409 |
| 4,231,247 | 11/1989 | Haydon | 411/400 |
| 4,867,403 | 9/1989 | Anderson | 52/DIG. 1 |
| 4,889,459 | 12/1989 | Anderson | 411/400 |

Primary Examiner—Neill R. Wilson
Attorney, Agent, or Firm—Kenneth P. Glynn

[57] ABSTRACT

The present invention involves a construction sheet material installation tool used to assist a worker to install sheets of material that would ordinarily require more than one worker. The tool includes a screw that has its non-threaded end embedded into a base, and the threaded portion of the screw extends outwardly perpendicular from the top surface of the base. The base has at least one side ledge that extends downwardly from the top surface at an obtuse angle. The top surface and side ledge of the base are all widened as to provide support to common construction sheet material without damaging the same. It is used by partially screwing into the overhead surface on which the construction sheet material will be installed to leave a gap. One end of the construction sheet is lifted to engage the side ledge of the device. The construction sheet material is then pushed upward from its opposite end into the gap and securely held in place by the invention, until the sheet material can be permanently installed.

18 Claims, 3 Drawing Sheets

TOOL FOR OVERHEAD SHEET INSTALLATION

BACKGROUND OF THE INVENTION

1. Field of the Invention

The present invention is directed toward a construction sheet material installation tool, and more particularly to such tools that enable a single user to hold larger or overweight sheets of construction material in place, either overhead or vertically, until the user can permanently secure the materials into position.

2. Prior Art Statement

During construction projects, many simple activities require the efforts of more than one person, simply because the materials used are too large or heavy to be directed by one person. The most common of these situations occur when sheets of construction material (such as sheetrock or plywood) are being placed either overhead on ceilings or vertically on walls. However, many times there is only one person available for the job, and over the years many devices have been developed to assist a single person in handling these large sheets of construction material. The most common type devices used are ground based supports. These supports are either single member supports or mechanical lifts that hold the construction materials. In either case, the ground base supports are expensive, cumbersome, hard to operate by one person and often obstruct the worker. As an alternative to the ground base supports, devices have been developed that attach directly to the overhead or vertical surface and hold the construction material in place. This prior art for such devices is as follows:

U.S. Pat. No. 4,867,403 to Paul C. Anderson shows an overhead sheet installation support tool. This device, like the current invention, screws into the surface on which the sheet material will be attached, and supports the edges of the sheet until it is secured. This device, however, includes a set of manually adjustable support members in addition to the screw. The support members add greatly to the cost and the effort needed to manufacture the device and it requires a substantial amount of time to adjust the support members adequately. Additionally, the device lacks present invention widened edge(s) that support the construction sheet material as it is being pushed into place. The widened edges prevent the construction sheet material from being damaged under its own weight as it engages the device or rests upon its top surface.

U.S. Pat. No. 4,889,459 also to Paul C. Anderson describes a further improved overhead sheet installation support tool. This device has two pivotally adjustable members in addition to the attachment screw. These adjustable members require a high manufacturing cost and require a difficult and time consuming adjustment each time the device is used. Additionally, this device lacks both a straight side ledge or a widened support for its top surface or side ledge. Both the lack of a widened support and a straight side ledge can cause damage to the construction sheet material as it is placed into, or held by, this device.

Thus, the prior art does teach the use of screw based construction sheet installation support tools but the prior art does not teach or suggest such devices that have widened side ledge(s), a minimization of parts and cost, and a simplicity of manufacturability and use that is shown by the invention developed herein.

SUMMARY OF THE INVENTION

The present invention is directed toward a construction sheet material installation tool which is used to assist a worker to individually install oversize or overweight sheets of material that would ordinarily require more than one worker. The tool includes a screw that has its non-threaded end embedded into a base, and the threaded portion of the screw extends outwardly perpendicular from the top of the base. The base has at least one side ledge that extends downwardly from the top surface at an obtuse angle. The top surface and side ledge of the base are all widened as to provide support to common construction sheet material without damaging the same. The invention is used by screwing the invention into the overhead or vertical surface on which the construction sheet material will be installed. A gap slightly larger than the construction sheet material is left between the top surface of the invention and the mounting surface. One end or long edge of the construction sheet is then lifted until it engages the side ledge of the device. The construction sheet material is then pushed upward from its opposite end or edge. The edge of the construction sheet material follows the ledge of the invention until the material's edge engages the gap at the top surface of the invention. The construction sheet material will then be securely held in place by the invention, until the sheet material can be permanently installed.

BRIEF DESCRIPTION OF DRAWINGS

The present invention will be more fully appreciated when the present specification is taken in conjunction with the appended drawings wherein.

DETAILED DESCRIPTION OF THE PRESENT INVENTION

Figure 1:
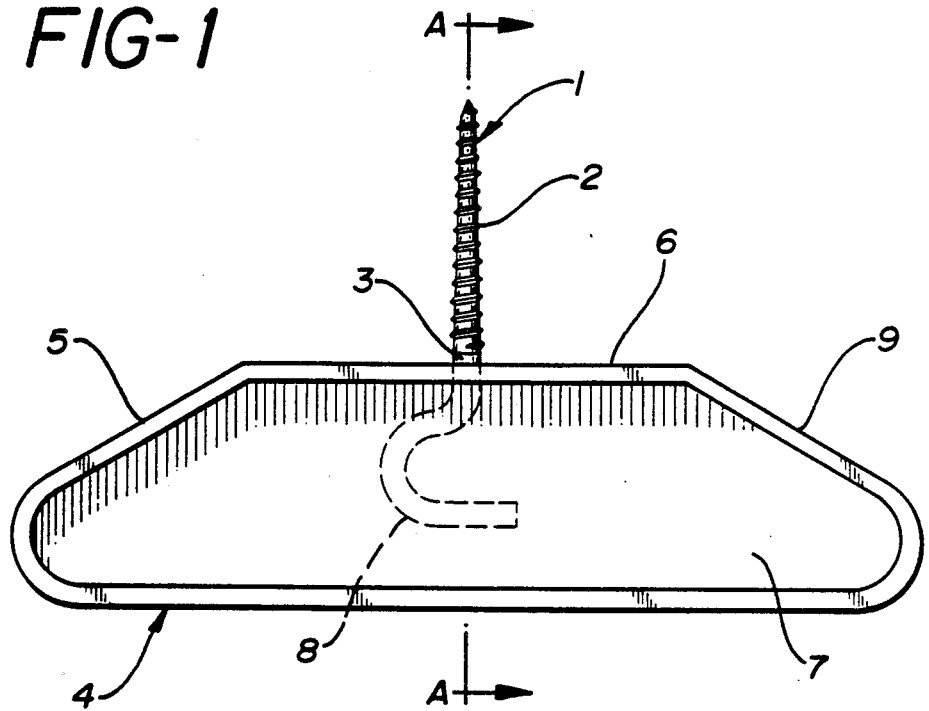
FIG. 1 shows a front view of one preferred embodiment of the present invention tool for assisting in overhead sheet material installation.

The present invention is, as mentioned, directed towards a construction sheet material installation tool, that allows a single worker to hold oversized or overweight sheet materials either overhead or vertically without the help of another. Construction sheet materials, such as sheetrock and plywood, are often too large and heavy to be maneuvered into an overhead or vertical position by one person. Consequently, many devices have been created to substitute for the need of a second person. Traditionally ground support devices have been created to support the sheet material while the worker permanently fastens the sheet material to the desired surface. Such ground support devices are expensive, cumbersome, inaccurate, and often their presence interferes with the workers ability to adequately fasten the material. To alleviate this problem, small devices that are surface based rather than ground based have been developed. These devices guide and hold sheet material in place directly on the mounting surface without obscuring a workers ability to fasten the material.

Such surface based supporting devices have only been in existance for a few years, and the devices developed to this point have certain negative characteristics. Surface based supporting devices for construction sheet material work by being attached to a surface prior to the application of the sheet material. The support devices act as small ledges for the sheet material, guiding and holding the edges of the sheet material until the operator can permanently fasten the sheet. However, the small edges of current support devices often damage the sheet material as it is moved past the devices and into position. Additionally, the small edges of current devices also damage some sheeting material due solely to the weight of the material on the supporting device. Existing sheet material supporting devices also have a plurality of adjustments as part of their designs. The adjustments add a multitude of parts to the devices that increase their cost of manufacturing as well as decreasing their ease of use. The adjustments must be set once the devices are placed on a surface, thus, if such devices are placed on a ceiling each device would individually have to be adjusted on the ceiling. This takes time and makes such devices difficult to use. Also the adjustments of such supporting devices are dependent upon the adjacent surfaces on which it is applied, as such the device cannot be simply turned and used again. The devices must now be readjusted to compensate for the prior sheet of material that has just been added in the adjacent position. Such readjustments require the user to climb back to each support to make the time consuming changes. Once the changes in adjustments are made, the newly adjusted support devices referenced their adjustments from the previously placed sheet of material. As a new sheet of material is placed into the supportive devices, the devices often yield slightly and the adjustments damage the previously installed sheet. The present invention eliminates the problems of high cost, difficulty of use, and damage to materials caused by existing devices, and in so doing it improves upon all existing prior art.

Figure 2:
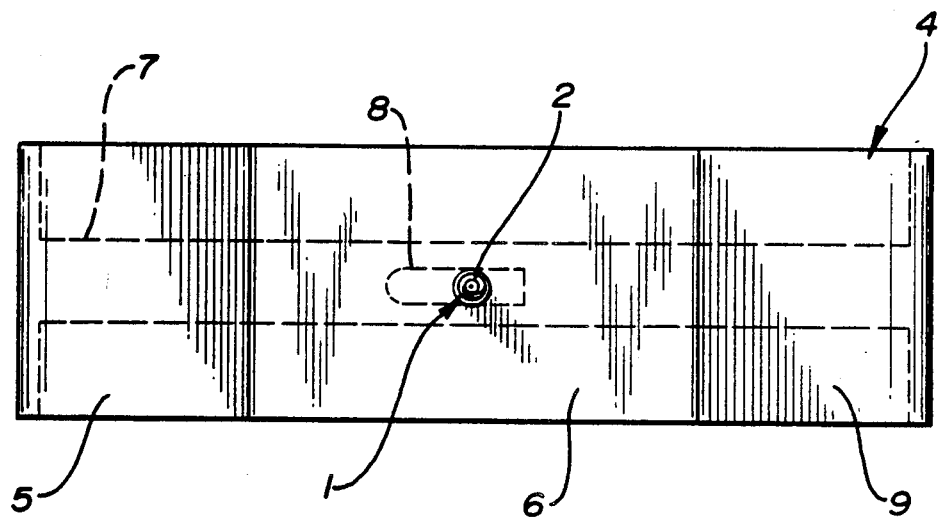
FIG. 2 shows the top view of the preferred embodiment depicted in FIG. 1.

Referring now to FIGS. 1 and 2 there are shown the front and top view, respectively, of one preferred embodiment of the present invention. The embodiments consist of a tapered screw 1 and a handle 4. The tapered screw 1 has a threaded portion 2, that extends perpendicular from the flat upper handle surface 6, and a formed portion 3 that is anchored to the handle 4. The formed portion of the screw 3 is configured with a convoluted extension 8 that is molded into the material of the handle 4. The convoluted extension 8 assures that the tapered screw 1 is firmly anchored to the handle 4, and that the tapered screw 1 will not loosen or move independent of the handle 4. The handle 4 has a flat upper surface 6 and two side surfaces 5 and 9 that meet the flat upper surface 6 at an obtuse angle. Although two angled surfaces 5 and 9 are shown, at least one is essential for the present invention. The flat upper surface 6 and the side surfaces 5 and 9 are formed from ledges that are wider than the handle's main body 7.

Figure 3:
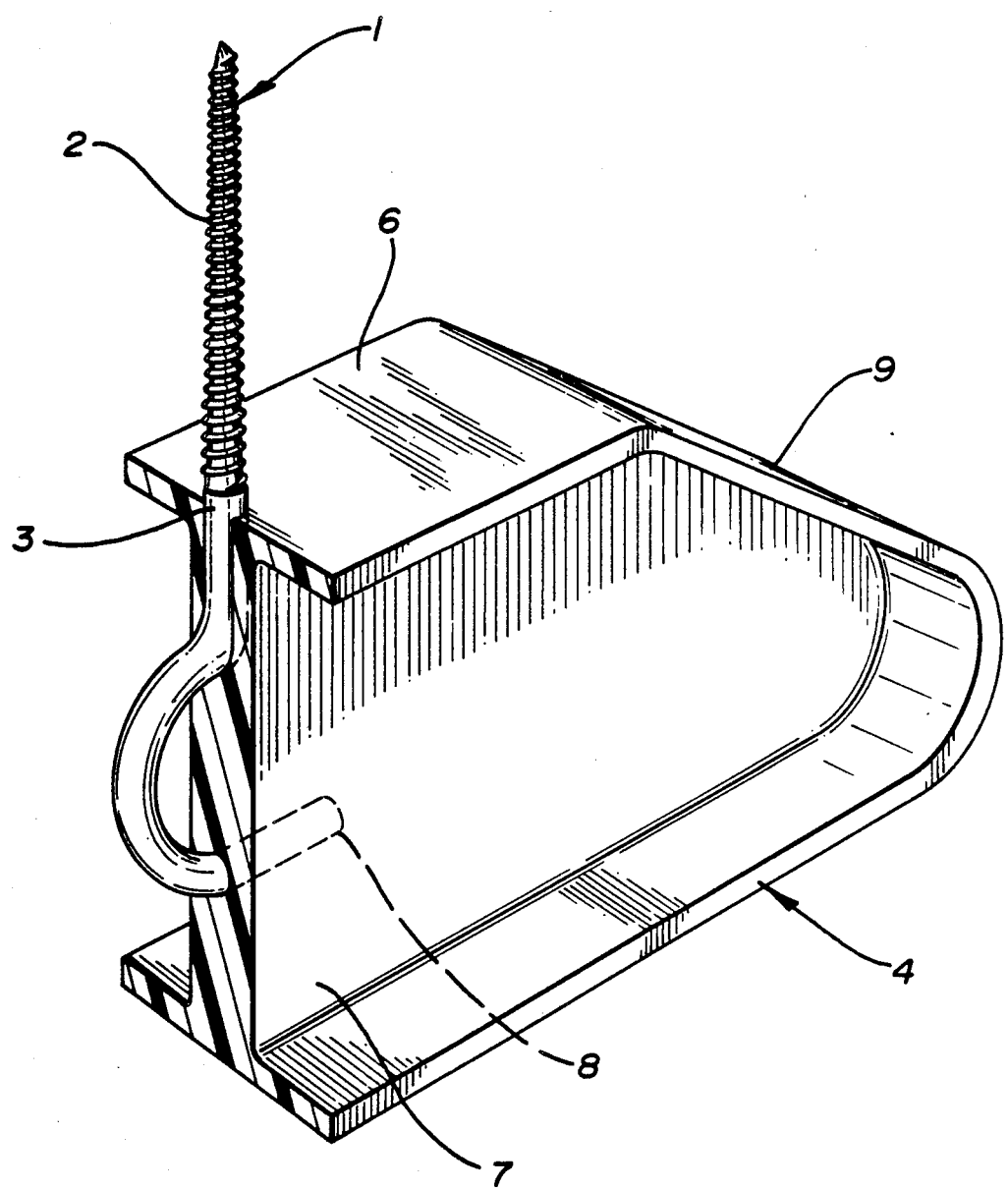
FIG. 3 is an oblique cross-sectional view of the preferred embodiment of FIG. 1 cut across the section line A—A.

FIG. 3 shows an oblique mid-cross-sectional view of the preferred embodiment shown in FIGS. 1 and 2. The view is the best illustration of the width of the flat upper handle surface 6 and the side surface 9 in relation to the smaller width of the handles main body 7. Also demonstrated by FIG. 3 is the anchoring effect of the tapered screws convoluted extension 8 with the handle 4. The material of the handle 4 surrounds the tapered screw's convoluted extension 8. The convolutions add greater surface contact to the handle 4 and assure a well anchored orientation.

The preferred embodiments depicted in FIGS. 1, 2 and 3 are operated in the following manner. The threaded portion 2 of the tapered screw 1 is turned into a mounting surface (not shown) by applying a torque force to the handle 4. The tapered screw 1 is driven into a mounting surface until the gap between the flat upper handle surface 6 and the mounting surface is slightly greater than the thickness of construction sheet material that is to be applied. Once the invention is in place, one side of the construction sheet material is placed against a side surface, e.g. 5 or 9. The opposting end of the construction sheet material is then lifted into position. As the construction material is positioned, its edge is forced along the angled side handle surface 9 and eventually rests upon the flat top handle surface 6, in the gap left between the mounting surface and the flat top handle surface 6. Once in this position the present invention firmly provides support to the construction sheet material until it can be permanently affixed to the mounting surface. The surfaces of the handles flat top 6 and sides 5 and 9 are smooth and widened to provide an adequate non-destructive support to the construction sheet material as it is moved past these surfaces during use.

Figure 4:
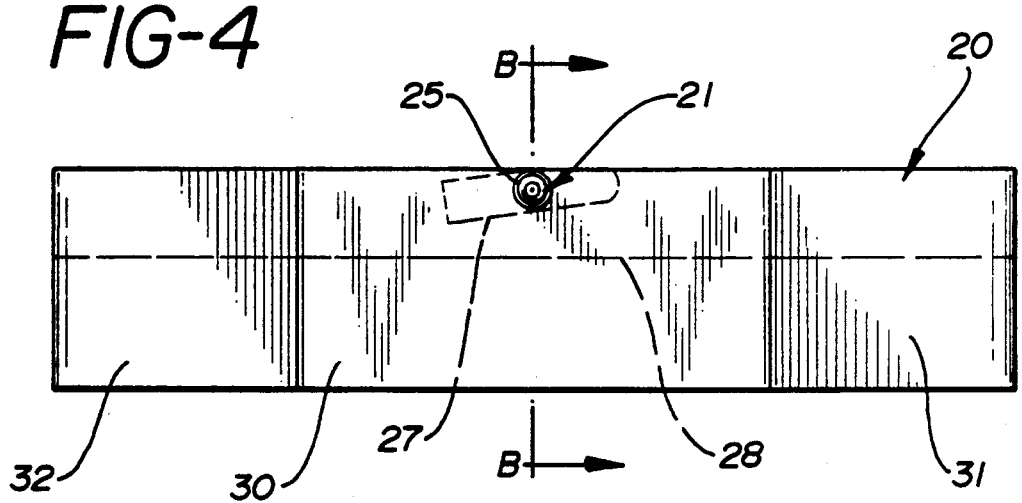
FIG. 4 is a top view of an alternate preferred embodiment for the present invention.
Figure 5:
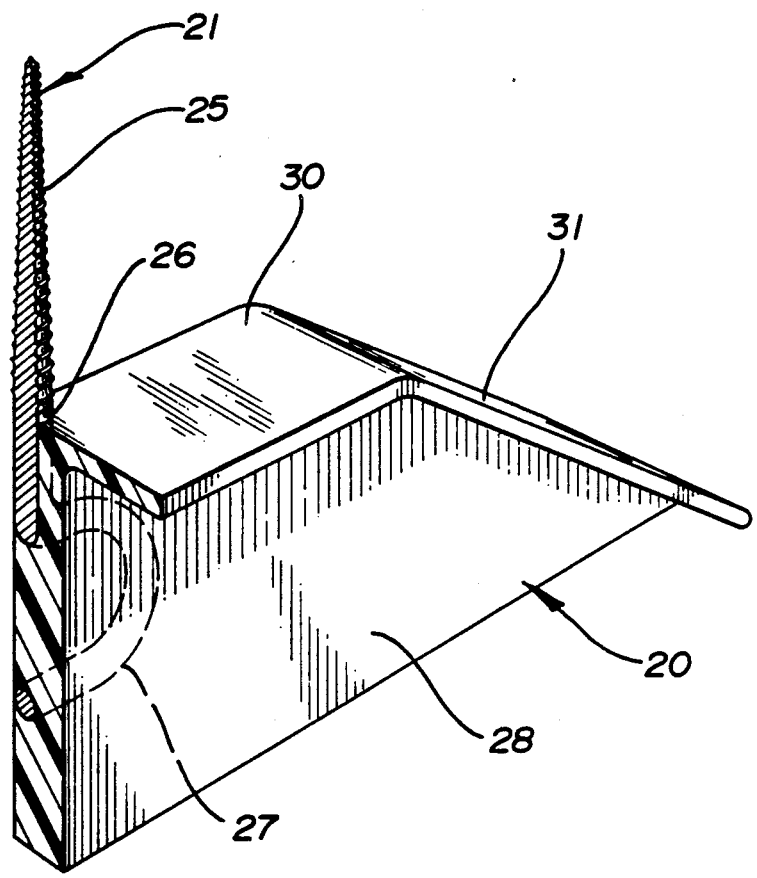
FIG. 5 is an oblique cross-sectional view of the alternate preferred embodiment of FIG. 4 cut along section line B—B.

Referring now to FIGS. 4 and 5 there is shown an alternative embodiment to the present invention. FIG. 4 is the top view and FIG. 5 the oblique mid-cross-sectional view of this embodiment cut along segment line B—B. As shown in these figures the tapered screw 21 is offset to one edge of the flat upper handle surface 30. This configuration allows the present invention to be placed on a mounting surface without its presence interfering with the area of sheet installation. As a sheet of construction material is positioned, the invention can be turned into place. The rotation of the handle 20 around the axis of the tapered screw 21 moves the flat upper handle surface 30 under the adjacent newly placed sheet of material. This support holds the sheet of material in place securely until it can be permanently attached, and allows the use of the present invention against walls and other space sensitive utilizations.

The present invention embodiment shown in the above specification represents the best mode contemplated for the invention. However, it is obvious that certain characteristics such as the shape of the tapered screwhead can be created in numerous configurations. Additionally, a large variety of materials can be used in the varied forms of the present invention. It is therefore understood that within the scope of the appended claims, the invention may be practiced otherwise than is specifically described within.

What is claimed is:

1. A construction sheet material installation support tool, which comprises:
   (a) a tapered screw having two sections, a threaded section and a formed head section;
   (b) a handle having a flat surface and at least one straight side surface extending at an obtuse angle therefrom; said straight side surface being at least one inch in width;
   (c) a means of affixing said formed head section of said tapered screw to said handle, where said handle prevents the independent movement of said formed screwhead, and said threaded section of tapered screw extends perpendicularly above said flat handle surface.

2. The tool of claim 1 wherin said formed head section of tapered screw has at least one substantially perpendicular extension protruding therefrom that is affixed to said handle.

3. The tool of claim 1 wherein formed head section tapered screw has at least one convoluted extension protruding therefrom that is affixed to said handle.

4. The tool of claim 1 wherein at least one said side handle surface joins said flat upper handle surface at an angle between 110 degrees–170 degrees.

5. The tool of claim 1 wherein said formed head section of tapered screw is molded within said handle.

6. The tool of claim 2 wherein said formed head section of tapered screw is molded within said handle.

7. The tool of claim 1 wherein said tapered screw extends between 2 inches and 4 inches above said handle.

8. The tool of claim 1 wherein said threaded section of tapered screw extending perpendicularly above said flat handle surface is positioned along the edge of said flat handle surface.

9. A construction sheet material installation support tool, which comprises:
   (a) a tapered screw having two sections, a threaded section and a formed head section;
   (b) a handle having a flat surface and at least one straight side surface extending at an obtuse angle therefrom; a means of affixing said formed head section of said tapered screw to said handle, said means being at least one convoluted extension of said formed head section of said screw protruding therefrom and affixed to said handle to prevent the independent movement of said formed screwhead, and said threaded section of tapered screw extends perpendicularly above said flat surface.

10. The tool of claim 9 wherein said flat upper handle surface and straight side surface are at least one-half (½) inch in width.

11. The tool of claim 9 wherein said flat upper handle surface and straight side surface are at least one (1) inch in width.

12. The tool of claim 9 wherein said formed head section of tapered screw has at least one susbtantially perpendicular extension protruding therefrom that is affixed to said handle.

13. The tool of claim 9 wherein at least one said side handle surface joins said flat handle surface at an angle between 110 degrees and 170 degrees.

14. The tool of claim 9 wherein said formed head section of tapered screw is molded within said handle.

15. The tool of claim 10 wherein said formed head section of tapered screw is molded within said handle.

16. The tool of claim 11 wherein said formed head section of tapered screw is molded within said handle.

17. The tool of claim 9 wherein said tapered screws extends between 2 inches and 4 inches above said handle.

18. The tool of claim 9 wherein said threaded section of tapered screw extending perpendicularly above said flat upper handle surface is positioned along the edge of said flat upper handle surface.

* * * * *